United States Patent [19]
Fujiwara et al.

[11] 3,949,623
[45] Apr. 13, 1976

[54] STEERING COLUMN ASSEMBLY

[75] Inventors: Yasuhiko Fujiwara; Kenzo Hirashima, both of Yokohama, Japan

[73] Assignee: Nissan Motor Co., Ltd., Japan

[22] Filed: Feb. 19, 1974

[21] Appl. No.: 443,201

[30] Foreign Application Priority Data
Feb. 22, 1973  Japan.................................. 48-21637

[52] U.S. Cl. ................................................. 74/492
[51] Int. Cl.$^2$......................................... G01P 15/04
[58] Field of Search............................. 74/492, 493

[56] References Cited
UNITED STATES PATENTS

| | | | |
|---|---|---|---|
| 3,435,700 | 4/1969 | Calhoun............................... | 74/493 |
| 3,483,768 | 12/1969 | Glass..................................... | 74/492 |
| 3,537,329 | 11/1970 | Ravenel................................ | 74/492 |
| 3,656,366 | 4/1972 | Somero................................. | 74/492 |
| 3,791,233 | 2/1974 | Bane..................................... | 74/492 |
| 3,811,337 | 5/1974 | Allison.................................. | 74/492 |
| 3,813,960 | 6/1974 | Windett et al......................... | 74/492 |

FOREIGN PATENTS OR APPLICATIONS

| | | | |
|---|---|---|---|
| 1,342,860 | 10/1963 | France.................................. | 74/492 |

*Primary Examiner*—Benjamin W. Wyche
*Assistant Examiner*—Lance W. Chandler
*Attorney, Agent, or Firm*—Robert E. Burns; Emmanuel J. Lobato; Bruce L. Adams

[57] ABSTRACT

A steering column assembly for a motor vehicle having a collision sensor which provides a collision signal in the event of a collision. It comprises a telescopic steering rod having a lower part and an upper part carrying a steering wheel, and means for normally stopping the upper part axial movement relative to the lower part in its normally operative position and for driving the upper part to a retracted safe position in the direction toward the lower part upon receipt of the collision signal.

8 Claims, 5 Drawing Figures

STEERING COLUMN ASSEMBLY

The present invention relates to a steering column assembly for a motor vehicle, of such a construction that a steering wheel is withdrawn from the passenger compartment in the event of a collision, thus lessening danger of injury due to strong hit of a driver against the steering wheel.

The present invention is based on the known problem to provide for the driver an increased impact protection which is to become effective, in particular, during collisions or accidents, especially in head-on collision or accidents when the motor vehicle runs accidently against an obstacle.

Modern motor vehicle has a safety seat belt arranged to prevent a driver from being thrown forward from his seated position. However the driver, even though he wears the seat belt, may hit against a steering wheel held in its normal operative position by a steering column. Thus there is a possibility of injury due to the hit of the driver against the steering wheel. The present invention aims at lessening danger of injury by withdrawing the steering wheel from its normal operative position.

It is an object of the present invention to provide a steering column which is provided with means for maintaining the steering wheel thereof in a normal operative position and for withdrawing the steering wheel to a retracted safe position in the event of a collision.

It is another object of the present invention to provide a stop and drive arrangement for a steering column which normally stops upper part of a steering rod in the axial movement relative to a lower part thereof in a predetermined position and drives the upper part in a direction toward the lower part to the retracted safe position upon receipt of a collision signal.

It is still another object of the present invention to provide a steering column which can fail safe in that if for some reason the stop and drive arrangement should have been rendered operative in normal driving conditions its steering wheel can still be maintained in its operative position.

These objects, features and advantages of the present invention will become more obvious from the following description when taken in connection with the accompanying drawings, which show, for purposes of illustration only, several embodiments in accordance with the present invention, and in which.

Figure 1:
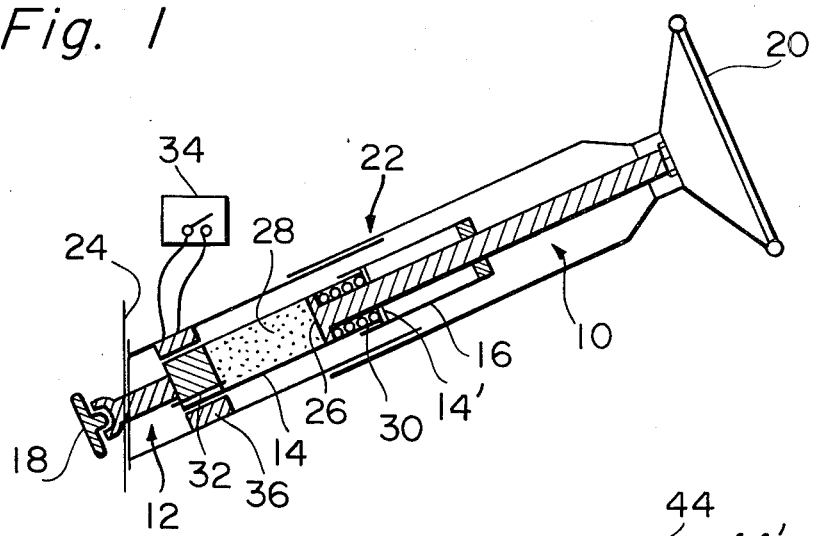
FIG. 1 is a cross sectional schematic view of a steering column and illustrating a stop and drive arrangement.

Referring now to the drawings and more particularly to FIG. 1 thereof the upper part of a steering column is designated therein as reference numeral 10 and the lower part thereof reference numeral 12. The lower part of the steering column 12 is provided with a cylinder 14 secured coaxially thereto which is provided along the outer side thereof with an external splined configuration (not shown) which engages with the internal splined configuration (not shown) of complementary shape provided in the interior walls of a sleeve 16 coaxially secured to the upper part 10. Thus the upper and lower parts of the steering column 10 and 12 are adapted to slide one into the other and connected with each other for simultaneous rotation. The steering column connected at its lower end to a steering gear 18 and at its upper end a steering wheel 20 is rotatably mounted within a telescopic jacket tube 22 rigidly secured at its lower end to a fire wall 24 of a motor vehicle (not shown).

For purposes of stopping or halting the upper part 10 of the steering column in the normal operative position during normal driving operation of the vehicle, a piston 26 which is adapted to sealingly slide in the cylinder bore 14 and forms within the cylinder bore a chamber 28 filled with pressurized gas is secured to the upper part 10. The piston 26 is urged against the pressure of gas in the chamber 28 by a compression spring 30 which is caged in compression between an annular end closure plate 14' of the cylinder 14 and the piston 26 so that the upper part 10 is stopped against the axial movement relative to the lower part 12 in the illustrated position. A trigger valve 32 which allows the escape of or releases gas within the chamber 28 responsive to an electric signal provided by a collision switch 34 is provided on the cylinder 14. The electric signal is transmitted from the collision switch 34 through a slip ring 36 to the trigger valve 32. The collision switch 34 is adapted to be closed in the event of a collision.

When the trigger valve 32 is opened to allow gas within the chamber 28 to be exhausted or scavanged out of the chamber 28 upon receipt of a collision signal, the piston 26 is driven deeply into the chamber 28 toward the retracted safe position due to the force or action of the compression spring 30. This movement of the piston 30 causes the withdrawal of the steering wheel 20.

Figure 2:
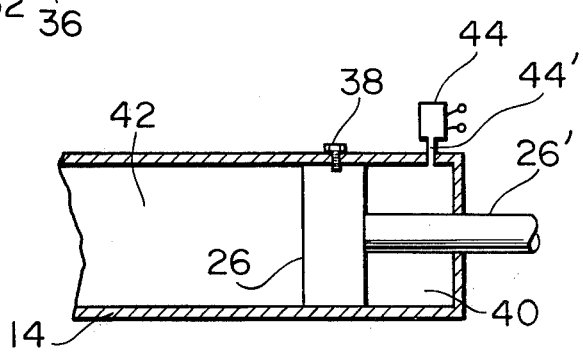
FIG. 2 is a cross sectional schematic view of a second example of a stop and drive arrangement for a steering column.

Referring next to FIG. 2, there is shown a second example of a stop and drive arrangement. In this example a piston 26 which is secured to the upper part of steering column (ref. FIG. 1) through a piston rod 26' is stopped in its axial movement relative to cylinder 14 by shear pin or pins 38. The piston rod 26' and the piston 26 define a generally annular closed chamber 40 within the cylinder bore 14 and the piston 26 defines an open chamber 42. The piston 26 is sealingly slidable within the cylinder 14. For the purpose of driving the piston 26 into the cylinder bore 14 a pressurized gas source 44 is mounted on the cylinder 14 with its discharge spout 44' opening to the annular chamber 40. The discharge spout 44' is normally closed by an electrically operable on-off valve (not shown), such as a solenoid actuated valve. The solenoid actuated valve allows the pressurized gas to enter the annular chamber 40 through the discharge spout 44' upon receipt of a collision signal. Upon receipt of a collision signal a pressurized gas will fill the annular chamber 40 inducing the pressure to actuate the piston 26. When the piston 26 is urged by the pressure created within the annular chamber 40, the shear pin 38 is broken by the load applied by the piston 26 permitting the piston 26 to be driven toward the open chamber 42.

Figure 3:
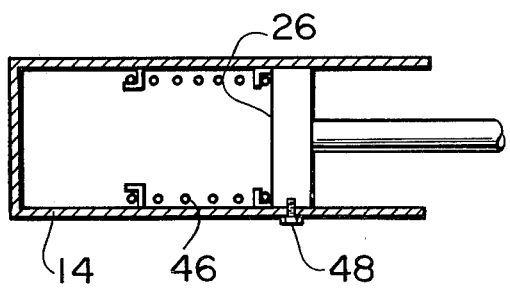
FIG. 3 is a cross sectional schematic view of a third example of a stop and drive arrangement for a steering column.

An example illustrated in FIG. 3 comprises a tension spring 46 to bias a piston 26 which is secured to the upper part of a steering column (not shown) deeply into a cylinder 14 toward the retracted safe position and a trigger stud 48 to normally hold the piston 26 in the illustrated normally operative position. The tension spring 46 is arranged in such a manner that it applies on the piston 26 a force tending to drive the piston deeply into the cylinder 14 toward the retracted safe position. Although not illustrated in detail the trigger stud 48 is so constructed as to be broken when a collision signal is transmitted thereto. Upon receipt of the collision signal the piston 26 is driven by the tension spring 46 into the cylinder 14, withdrawing the steering wheel (ref. FIG. 1).

Figure 4:
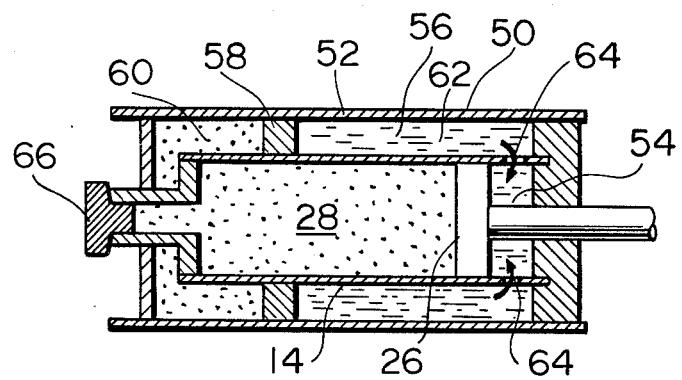
FIG. 4 is a cross sectional schematic view of a fourth example of a stop and drive arrangement for a steering column.

An example illustrated in FIG. 4 employs a pressurized liquid source 50. The pressurized liquid source 50 which is coaxially secured to lower part of a steering column (not shown) has a tubular housing 52 provided along the outer side thereof with an external splined configuration (not shown) which engages with the internal splined configuration of complementary shape provided in the interior walls of a sleeve (not shown) coaxially secured to the upper part of the steering column (ref. FIG. 1). A piston 26 which is sealingly slidable within a cylinder 14 defines within the cylinder bore a pressurized gas chamber 28 and, the piston 26 and a piston rod 26' define within the cylinder bore 14 a generally annular chamber 54. The cylinder 14 is mounted concentrically to define within the interior of the tubular housing 52 a generally annular space 56 which is divided by an annular free piston 58 into a pressurized gas compartment 60 and a pressurized liquid compartment 62. As shown the pressurized liquid compartment 62 is in open communication with the annular chamber 54 through passages 64. When the gas within the pressurized gas chamber 28 is scavanged by opening of a valve (only schematically shown at 66) upon receipt of a collision signal the piston 26 is driven toward the chamber 28 due to the pressure of liquid within the annular chamber 54. Of course during this operation the free piston 58 due to the pressure of gas within the gas compartment 60 will displace liquid within the liquid compartment 62 into the annular chamber 54, causing the piston 26 to move into the cylinder bore 14.

In the preceding description of FIGS. 1 to 4 several stop and drive arrangements have been exemplified. They all has a common feature that they will drive the upper part 10 of the steering column toward the lower part 12 upon receipt of a collision signal.

Figure 5:
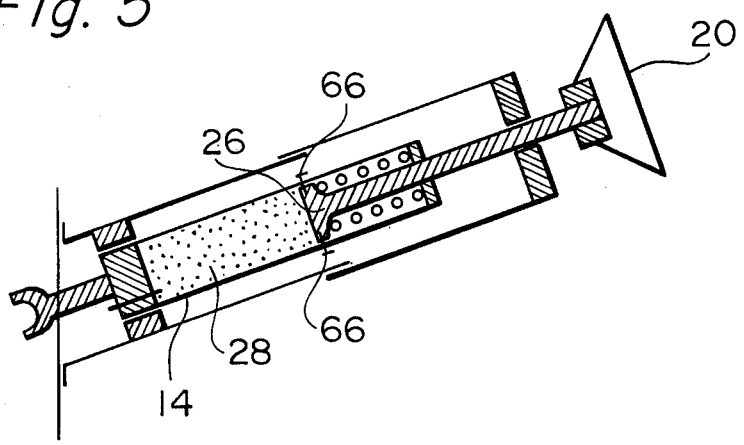
FIG. 5 is a cross sectional schematic view of a steering column of FIG. 1 with certain parts removed and illustrating a modification of the steering column.

FIG. 5 shows a steering column which can fail safe in that if for some reason the stop and drive arrangement has been rendered operative during normal driving conditions of the vehicle its steering wheel can still be maintained in its operative position. However the steering wheel is withdrawn due to the inertia of the steering wheel and upper part of the steering column in the event of head-on collision.

In FIG. 5 the last mentioned feature is embodied in the steering column assembly shown in FIG. 1. A plurality of shear pins 66 are provided to engage the piston 26 in the illustrated position relative to the cylinder bore 14 even if gas within the pressurized gas chamber 28 have been leaked out thereof during normal operating conditions of motor vehicle. However in the event of a head-on collision the shear pins 66 are broken by an additional load applied thereto by piston 26 due to the inertia of upper part 10 of steering column and the steering wheel 20.

While there have been shown several embodiments in accordance with the present invention all in schematic views, it is to be understood that the same is not limited thereto but is susceptible of many changes and modifications within the spirit and scope of the present invention and, therefore, it is not wished that the present invention is limited to the views shown and described herein, but the present invention is intended to cover all such changes and modifications as are encompassed by the scope of the appended claims.

What is claimed is:

1. A steering column assembly, in a motor vehicle having a collision sensor which provides a collision signal in the event of a collision of the vehicle, comprising: a steering rod having a lower part and an upper part, the upper part having attached thereto a steering wheel; means mounting said upper part for free axial movement relative to said lower part from a normal operative position to a retracted safe position; means normally stopping said upper part in the axial movement relative to said lower part in said normal operative position and operatively responsive to the collision signal for driving said upper part toward said retracted safe position; said stopping and driving means comprising a piston secured coaxially to said upper part, said lower part having a cylinder bore formed therein within which said piston is slidable; a compression spring yieldably biasing said upper part toward said retracted safe position; a gas chamber defined by said piston in the cylinder bore, said gas chamber being filled with a pressurized gas to bias said piston against said compression spring to hold said upper part in said normal operative position; and a valve means responsive to the collision signal for releasing the pressurized gas from said gas chamber to permit movement of said upper part to said retracted safe position under the influence of said compression spring.

2. A steering column assembly as claimed in claim 1, including means including a plurality of shear pins for holding said upper part in said normal operative position and for releasing said upper part for movement toward said retracted safe position upon the exertion of a predetermined axial load on said steering column.

3. A steering column assembly, in a motor vehicle having a collision sensor which provides a collision signal in the event of a collision of the vehicle, comprising: a steering rod having a lower part and an upper part, the upper part having attached thereto a steering wheel; means mounting said upper part for free axial movement relative to said lower part from a normal operative position to a retracted safe position; means normally stopping said upper part in the axial movement relative to said lower part in said normal operative position and operatively responsive to the collision signal for driving said upper part toward said retracted safe position; said stopping and driving means comprising a piston secured coaxially to said upper part, said lower part having a cylinder bore formed therein and having said piston slidable therein; a tension spring yieldably biasing said upper part toward said retracted safe position; and a trigger stud to normally hold said upper part in said normal operative position against said tension spring and responsive to the collision signal to permit movement of said upper part toward said retracted safe position under the influence of said tension spring.

4. A steering column assembly, in a motor vehicle having a collision sensor which provides a collision signal in the event of a collision of the vehicle, comprising: a steering rod having a lower part and an upper part, the upper part having attached thereto a steering wheel; means mounting said upper part for free axial movement relative to said lower part from a normal operative position to a retracted safe position; means normally stopping said upper part in the axial movement relative to said lower part in said normal operative position and operatively responsive to the collision signal for driving said upper part toward said retracted safe position; said stopping and driving means comprising a piston secured coaxially to said upper part and having a piston rod connecting it thereto, said lower part having a cylinder bore formed therein in which said piston is slidable, said piston and rod defining a generally annular closed chamber in said cylinder bore; a pressurized liquid source communicating with said generally annular closed chamber, said pressurized liquid source yieldable biasing said upper part toward said retracted safe position; a gas chamber defined by said piston in said cylinder bore, said gas chamber being filled with a pressurized gas to bias said piston against pressure by said pressurized liquid source to hold said upper part in said normal operative position; and a valve means responsive to the collision signal for releasing the pressurized gas from said gas chamber to permit movement of said upper part to said retracted safe position under the influence of said pressurized liquid source.

5. A steering column assembly, in a motor vehicle having a collision sensor which provides a collision signal in the event of a collision of the vehicle, comprising:
a steering rod having a lower part and an upper part, the upper part having attached thereto a steering wheel;
means mounting said upper part for free axial movement relative to said lower part from a normal operative position to a retracted safe position, said mounting means including a sleeve secured coaxially to said upper part and a cylinder secured coaxially to said lower part, said cylinder being telescopically received in said sleeve and splined thereto;
a piston secured coaxially to said upper part, said piston being slidable in a cylinder bore of said cylinder;
a compression spring yieldably biasing said upper part toward said retracted safe position;
a gas chamber means in the cylinder bore of said cylinder for biasing said piston against said compression spring to hold said upper part in said normal operative position, said gas chamber means being filled with a pressurized gas; and
a valve means responsive to the collision signal for releasing the pressurized gas from said gas chamber means to permit movement of said upper part toward said retracted safe position under the influence of said compression spring, and said valve means being mounted on said cylinder.

6. A steering column assembly as claimed in claim 5, including means including a plurality of shear pins for holding said upper part in said normal operative position and for releasing said upper part for movement toward said retracted position upon the exertion of a predetermined axial load on said steering column.

7. A steering column assembly, in a motor vehicle having a collision sensor which provides a collision signal in the event of a collision of the vehicle, comprising:
a steering rod having a lower part and an upper part, the upper part having attached thereto a steering wheel;
means mounting said upper part for free axial movement relative to said lower part from a normal operative position to a retracted safe position, said mounting means including a sleeve secured coaxially to said upper part and a cylinder secured coaxially to said lower part, said cylinder being telescopically received in said sleeve and splined thereto;
a piston secured coaxially to said upper part, a piston rod securing said piston to said upper part, said piston being slidable in a cylinder bore of said cylinder, said piston and rod defining a generally annular closed chamber in the cylinder bore;
shearing means for releasably holding said upper part in said normal operative position;
a pressurized gas source having a discharge spout opening to said annular closed chamber; and
means responsive to the collision signal for allowing a pressurized gas from said pressurized gas source into said annular closed chamber to release said shearing means and to bias said upper part to move toward said retracted position.

8. A steering column assembly, in a motor vehicle having a collision sensor which provides a collision signal in the event of a collision of the vehicle, comprising:
a steering rod having a lower part and an upper part, the upper part having attached thereto a steering wheel;
means mounting said upper part for free axial movement relative to said lower part from a normal operative position to a retracted safe position, said mounting means including a sleeve secured coaxially to said upper part and a cylinder secured coaxially to said lower part, said cylinder being telescopically received in said sleeve and splined thereto;
a piston secured coaxially to said upper part, a piston rod securing said piston to said upper part, said piston being slidable in a cylinder bore in said cylinder, said piston and rod defining a generally annular closed chamber in the cylinder bore;
a pressurized liquid source communicating with said generally annular closed chamber to yieldably bias said upper part toward said retracted safe position;
a gas chamber defined by said piston in said cylinder bore, said gas chamber being filled with a pressurized gas to bias said piston against pressure by said pressurized liquid source to hold said upper part in said normal operative position; and
a valve means responsive to the collision signal for releasing the pressurized gas from said gas chamber to permit movement of said upper part toward said retracted safe position under the influence of said pressurized liquid source.

* * * * *